(12) United States Patent
Braun et al.

(10) Patent No.: US 8,871,834 B2
(45) Date of Patent: Oct. 28, 2014

(54) STABILIZED POLYPROPYLENE-TALC COMPOSITE

(75) Inventors: Juliane Braun, Linz (AT); Johannes Wolfschwenger, Niederneukirchen (AT)

(73) Assignee: Borealis AG, Vienna (AU)

( * ) Notice: Subject to any disclaimer, the term of this patent is extended or adjusted under 35 U.S.C. 154(b) by 235 days.

(21) Appl. No.: 13/261,072

(22) PCT Filed: Jun. 16, 2010

(86) PCT No.: PCT/EP2010/058428
§ 371 (c)(1),
(2), (4) Date: Dec. 9, 2011

(87) PCT Pub. No.: WO2010/149546
PCT Pub. Date: Dec. 29, 2010

(65) Prior Publication Data
US 2012/0088870 A1    Apr. 12, 2012

(30) Foreign Application Priority Data

Jun. 22, 2009  (EP) ..................................... 09163400

(51) Int. Cl.
C08K 9/04    (2006.01)
C08K 5/00    (2006.01)
C08L 23/10   (2006.01)

(52) U.S. Cl.
CPC ................. C08K 5/0091 (2013.01); C08K 9/04 (2013.01); C08L 23/10 (2013.01)
USPC ........... 523/200; 524/451; 524/581; 524/582; 524/584

(58) Field of Classification Search
USPC .......................................... 523/200; 524/451
See application file for complete search history.

(56) References Cited

U.S. PATENT DOCUMENTS 4,087,402 A    5/1978   Monte et al.

FOREIGN PATENT DOCUMENTS

| | | |
|---|---|---|
| DE | 2621463 A1 | 11/1976 |
| EP | 1988122 A1 | 11/2008 |
| EP | 2141196 A1 | 1/2010 |
| WO | 03055946 A1 | 7/2003 |
| WO | 2009129873 A1 | 10/2009 |

*Primary Examiner* — Vickey Nerangis
(74) *Attorney, Agent, or Firm* — Warn Partners, P.C.

(57) ABSTRACT

Use of an talc being coated with an organo-metallic compound in a polymer composition to accomplish a headspace emission of all volatiles together of said polymer composition of equal or below 120 μg/g.

18 Claims, No Drawings

STABILIZED POLYPROPYLENE-TALC COMPOSITE

This application is a National Stage of International Application No. PCT/EP2010/058428, filed Jun. 16, 2010. This application claims priority to European Patent Application No. 09163400.6, filed on Jun. 22, 2009. The disclosures of the above applications are incorporated herein by reference.

The present invention relates a new polypropylene composition comprising phenolic antioxidants and the use of an organo-metallic coated talc in polymer compositions.

Polypropylene is the material of choice for many applications. For instance polypropylene in combination with talc is used as back sheets of blister packaging as well as in articles in the automotive interior. Said polypropylene/talc compositions are—generally speaking—good processable and can be individually customized. However such materials must also provide long term stability against environmental impacts, like oxidative degradation, keeping the tailored properties of the polypropylene/talc composition on the desired level. Accordingly antioxidants are added to impair the degradation of the polypropylene/talc compositions. However the antioxidants themselves may be instable under specific environmental stresses, which might lead also to malodour. Over the last years the standard requirements for long term stability have been even steadily tightened, which in turn increased the amounts of additives to satisfy the ambitioned desires, like heat resistance and/or mechanical properties. On the other hand such an increasing amount of additives intensifies the risk of side reactions. Such side reactions, in particular in cases where degradation of antioxidants is involved, lead to side products being quite often volatile. Of course volatile compounds should be kept on low levels in particular as they are not accepted by the customers.

Thus the object of the present invention is to reduce the amount of volatile compounds, in particular of 2-methyl-propene, in polymer compositions comprising phenolic antioxidants. There is in particular the desire to reduce the amount of headspace emission according to VDA 277.

The first finding of the present invention is that the amount of volatile compounds is mainly based on the rather rapid degradation of phenolic antioxidants in the presence of talc. The second finding of the present invention is that the degradation of the antioxidants can be reduced by coating talc.

Thus in a first aspect the present invention is directed to the use of an organo-metallic compound (OM) in a polymer composition to accomplish a headspace emission measured according to VDA 277

(a) of all volatiles together of said polymer composition of equal or below 120 µg/g, preferably below 110 µg/g, more preferably below 100 µg/g. still more preferably below 95 µg/g and/or (b) of 2-methyl-propene of said polymer composition of not more than 70 µg/g, preferably below 20 µg/g, more preferably below 10 µg/g. still more preferably below 5 µg/g, yet more preferably below 1.0 µg/g, still yet below 0.7 µg/g, like below the detection limit of 2-methyl-propene.

More precisely the present invention is directed in a first aspect to the use of an organo-metallic compound (OM) in a polymer composition to coat talc (T). In particular the talc (T) is treated with an organo-metallic compound (OM) obtaining a coated talc (CT), wherein preferably the organo-metallic compound (OM) is chemically (covalently) bonded to the talc.

In a further aspect the present invention is directed the use of a coated talc (CT) in a polymer composition to accomplish a headspace emission measured according to VDA 277

(a) of all volatiles together of said polymer composition of equal or below 120 µg/g, preferably below 110 µg/g, more preferably below 100 µg/g. still more preferably below 95 µg/g and/or (b) of 2-methyl-propene of said polymer composition of not more than 70 µg/g, preferably below 20 µg/g, more preferably below 10 µg/g. still more preferably below 5 µg/g, yet more preferably below 1.0 µg/g, still yet below 0.7 µg/g, like below the detection limit of 2-methyl-propene.

More precisely the present invention is directed the use of coated talc (CT) in a polymer composition to accomplish a headspace emission measured according to VDA 277

(a) of all volatiles together of said polymer composition of equal or below 120 µg/g, preferably below 110 µg/g, more preferably below 100 µg/g. still more preferably below 95 µg/g and/or (b) of 2-methyl-propene of said polymer composition of not more than 70 µg/g, preferably below 20 µg/g, more preferably below 10 µg/g. still more preferably below 5 µg/g, yet more preferably below 1.0 µg/g, still yet below 0.7 µg/g, like below the detection limit of 2-methyl-propene, wherein said talc (CT) is coated with an organo-metallic compound (OM), preferably wherein said coated talc (CT) is a reaction product of an organo-metallic compound (OM) and talc (T).

The term "coated" in the presence inventions means that talc's surface has been sheeted with a chemical compound, in particular with an organo-metall compound (OM) as defined herein. Accordingly the protecting layer (the coating) may be physically or chemically bonded to the talc, the latter being preferred. Preferably the organo-metall compound occupies the reactive residues of the talc, like the hydroxy-groups. Preferably the occupation is accomplished by covalent bonding between the residues of talc, like the hydroxy groups of talc, and the organo-metall compound (OM). In a specific embodiment at least 50%, preferably at least 80%, more preferably at least 90% of the reactive residues, in particular of the hydroxyl groups, of talc are occupied with the organo-metall compound (OM), wherein the percentage has been determined by IR-spectroscopy, in particular by the intensity of the OH-band in the IR-spectrum.

Accordingly, throughout the present invention the term "coated talc" (CT) is understood as the reaction product of an unmodified talc (talc (T)) which has been treated with an organo-metallic compound (OM) as defined herein. By "unmodified talc" (talc (T)) is meant talc which has been not coated or sheeted with an organic compound, in particular which has been not coated or sheeted with a organic compound selected from the group consisting of an organo-metallic compound (OM), a polyether, a carboxylic acid, a carboxylic acid amid and a carboxylic acid ester.

Preferably said polymer composition comprises polypropylene and/or (a) phenolic antioxidant(s) (AO). Even more preferred the polypropylene is the only polymer component within the polymer composition. Additionally it is appreciated that the polymer composition does not comprise hindered amine light stabilizers and/or slip agents, preferably slip agents being fatty acid amides.

To obtain the desired reduction of volatiles, like 2-methyl-1-propene, by keeping the mechanical properties on the desired level, it is appreciated to use the coated talc (CT) in a polymer composition in an amount from 10,000 to 550,000 ppm, preferably from 50,000 to 500,000 ppm, more preferably from 100,000 to 400,000 ppm, yet more preferably from 150,000 to 300,000 ppm.

Surprisingly it has been found out that the use of the coated talc (CT) resolves the problem of polymer composition comprising unmodified talc and phenolic antioxidants. The specific selection of coated talc (CT) as a substitute of unmodified talc allows reducing drastically the headspace emission of all volatiles, in particular of 2-methyl-1-propene, compared to standard polypropylene compositions comprising unmodified talc and phenolic antioxidants. Even more surprising this benefit is not paid with the loss of mechanical properties, like tensile modulus and/or flexural modulus (see table 1).

Even more preferred the present invention is directed to the use of a coated talc (CT) in a polymer composition to accomplish a headspace emission measured according to VDA 277
(a) of all volatiles together of said polymer composition of equal or below 120 µg/g, preferably below 110 µg/g, more preferably below 100 µg/g. still more preferably below 95 µg/g and/or
(b) of 2-methyl-propene of said polymer composition of not more than 70 µg/g, preferably below 20 µg/g, more preferably below 10 µg/g. still more preferably below 5 µg/g, yet more preferably below 1.0 µg/g, still yet below 0.7 µg/g, like below the detection limit of 2-methyl-propene,
wherein further the polymer composition comprises
(a) at least 50 wt.-%, preferably at least 70 wt.-%, more preferably at least 75 wt.-%, polypropylene
(b) 10,000 to 550,000 ppm, preferably 50,000 to 500,000 ppm, more preferably 100,000 to 400,000 ppm, yet more preferably 150,000 to 300,000 ppm, coated talc (CT),
(c) 100 to 5,000 ppm, preferably 500 to 5,000 ppm, more preferably 500 to 3,000 ppm, yet more preferably 200 to 1,000 ppm, of phenolic antioxidants, and
(d) optionally 100 to 5,000 ppm, preferably 500 to 3,000 ppm, more preferably 500 to 1,500 ppm, yet more preferably 1,000 to 1,500 ppm, of phosphorous antioxidants based on the polymer composition and
wherein further said talc (CT) is coated, preferably covalently linked, with an organo-metallic compound (OM). As stated above it is preferred that the polymer composition comprises as polymer said polypropylene only.

As usual 1 ppm of additive corresponds to 1 mg additive in 1 kg composition.

The term "volatiles" is understood according the present invention as substances which tend to vaporize from the polymer composition. More precisely "volatiles" are substances having a rather high vapour pressure and thus vaporize easily from the polymer composition. Thus volatiles according to the present invention are in particular substances having a normal boiling point (temperature at which the vapour pressure is equal to the surrounding atmospheric pressure (1.0 atm)) of not more than 80° C., more preferably of not more than 70° C., like not more than 60° C. The volatiles can be any substances part of the polymer composition and are in particular degradation products cause by chemical and/or physical reactions (processes) within in the polymer compositions. Typically the volatiles are degradation products of the additives of the polymer composition, like degradation products of the phenolic antioxidants, like hindered phenolic antioxidants as defined herein. Most important representative of the volatiles is the 2-methyl-1-propene, probably a degradation product of the phenolic antioxidants. The amount of volatiles, like 2-methyl-1-propene, of the polymer composition is determined by VDA 277. The exact measuring method is described in the example section. The analysed amount of volatiles is given by the ratio of the amount [µg] of volatiles (like 2-methyl-1-propene) to the total amount [g] of the polymer composition. Accordingly in one aspect the use of the coated talc (CT) in a polymer composition accomplishes a headspace emission measured according to VDA 277 of all volatiles together of said polymer composition of equal or below 120 µg/g, preferably below 110 µg/g, more preferably below 100 µg/g. still more preferably below 95 µg/g. In a second aspect or alternatively the use of the a talc (CT) in a polymer composition accomplishes a headspace emission measured according to VDA 277 of 2-methyl-propene of said polymer composition of not more than 70 µg/g, preferably below 20 µg/g, more preferably below 10 µg/g. still more preferably below 5 µg/g, yet more preferably below 1.0 µg/g, still yet more preferably below 0.7 µg/g, like below the detection limit.

The polypropylene used in the polymer composition can be any polypropylene, in particular polypropylenes suitable for the automotive interior and/or for back sheets of blister packaging, like a heterophasic polypropylene or a propylene homopolymer. Accordingly in case of automotive components a preferred polymer composition comprises, more preferably comprises as the only polymer component, a heterophasic propylene copolymer, while in case of blister back sheets a preferred polymer composition comprises, more preferably comprises as the only polymer component, a polypropylene homopolymer.

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

Heterophasic polypropylene systems are well known in the art and are systems in particular obtained in an at least two step process resulting in a multiphase structure comprising a polypropylene matrix, preferably an isotactic polypropylene matrix, and inclusions dispersed therein comprising amorphous elastomer. Such systems can be easily tailored for the requirements needed by setting the comonomer content in the polypropylene matrix and in the amorphous elastomer respectively. Such a heterophasic propylene copolymer may have an $MFR_2$ in the range of 2.0 to 80.0 g/10 min, more preferably in the range of 5.0 to 50.0 g/10 min, still more preferably in the range of 7.0 to 20.0 g/10 min. Typically such a heterophasic propylene copolymer has an amorphous elastomer being a propylene-ethylene rubber (EPR). The polypropylene matrix can be either a propylene homopolymer or a propylene copolymer, wherein the latter is especially preferred. The total comonomer, preferably ethylene, content is in the range of 2 to 25 wt.-% based on the total heterophasic propylene copolymer. The amount of xylene solubles may be in the range of 10 to 40 wt.-%, preferably 15 to 30 wt.-%.

Of course the polypropylene may additionally comprise beside the heterophasic propylene copolymer a high density polyethylene (HDPE) having for instance a density in the range of 0.954 to 0.966 g/cm3 and a melt flow rate ($MFR_2$ at 190° C.) of 0.1 to 15.0 g/10 min. Further the polypropylene may also comprise additionally EPR, propylene-ethylene copolymers and/or ethylene-octene copolymers.

It is however preferred that the polypropylene is the only polymer component in the polymer composition.

Accordingly it is appreciated that the polypropylene is present in the polymer composition in the amount of at least 50.0 wt.-%, more preferably at least 60.0 wt.-%, yet more preferably at least 70.0 wt.-%, still more preferably of at least 75.0 wt.-%.

Beside the polypropylene the polymer composition is in particular defined by its additives.

Accordingly to be useful in the above mentioned applications the inventive polymer composition must comprise an inorganic reinforcing agent. Talc is normally the additive of choice. However it has been discovered in the present invention that talc promotes the degradation of phenolic antioxidants and thus increases undesirably the amount of volatiles, in particular of 2-methyl-1-propene. Such a degradation of phenolic antioxidants is in particular pronounced in case the talc comprises a considerable amount of residues within in the talc, like iron oxide (FeO) and/or iron silicate. The degradation of the organic oxidants can be very easily deducted in the headspace emission according to VDA 277. The emission spectrum shows degradation products (for instance 2-methyl-1-propene) originating from the phenolic antioxidants.

One possible approach to reduce the amount of volatiles, like 2-methyl-1-propene, is to impede the catalytic activity of talc and/or its residues in view of the phenolic antioxidants. However the addition of further additives to prevent degradation of the phenolic antioxidants may cause other problems and thus it was sought for an alternative approach enabling also a significant reduction of volatiles, like 2-methyle-1-propene, measured according to VDA 277.

The present invention has now found out that the coating of talc with an organo-metallic compound (OM) can also significantly reduce the amount of volatiles, in particular of 2-methyl-1-propene, measured as the headspace emission according to VDA 277. More importantly such coating does not alter substantially the mechanical properties of the polymer composition.

Accordingly in the present invention talc is used which has been coated, preferably covalently linked, with an organo-metallic compound (OM). Organic metallic compounds (OM) are state of the art and have been known as a suitable tool to coat (sheet) inorganic fillers. Preferably the organic metallic compound (OM) according to the present invention comprises a metal of the groups 4 to 13 of the Periodic Table, more preferably zirconium or titanium, the latter being in particular preferred. It has been in particular observed that talc treated with organic metallic compound (OM) of formula (I) or formula (II), preferably of formula (I), exhibit especially good results. Accordingly the talc (CT) used in the present invention is preferably the reaction product of talc (T) and organo metal compound (OM) of formula (I) and/or formula (II), more preferably of formula (I). The organo metal compound (OM) of formula (I) is defined as

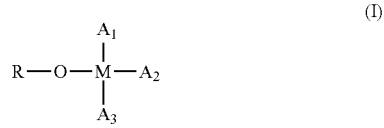

(I)

wherein

"M" is a metal of the groups 4 to 13 of the Periodic Table, preferably is a metal selected from the group consisting of titanium, zirconium, hafnium palladium, platinum, aluminum, more preferably is zirconium or titanium, yet more preferably is titanium, "$A_1$", "$A_2$", and "$A_3$" are residues independently selected from the group consisting of

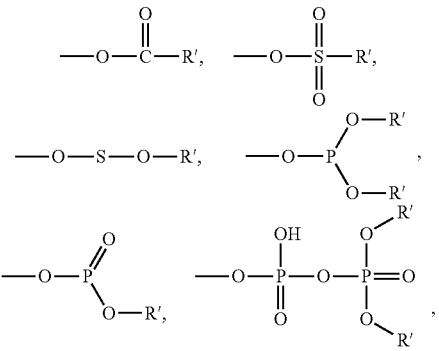

R is an alkyl-, alkenyl-, alkinyl- or arylalkyl residue with 1 to 30 carbon atoms, preferably a branched or straight chain C1 to C20 alkyl residue, R' is an alkyl-, alkenyl-, alkinyl- or arylalkyl residue with 1 to 30 carbon atoms, preferably C1 to C20 alkyl.

Preferably the residues "$A_1$", "$A_2$", and "$A_3$" are identical.

Preferably the R-residue is selected from the group consisting of methyl, n-propyl, iso-propyl, cyclopropyl, cyclohexyl, tetraethyloctadecyl, 2,4-dichlorobenzyl, 1-(3-bromo-4-nitro-7-acetylnaphthyl)ethyl, 2-cyano-furyl, 3-thiomethyl-2-ethoxy-1-propyl and methallyl, more preferably the R-residue is selected from the group consisting of methyl, n-propyl, iso-propyl, and cyclohexyl. In a preferred embodiment the R-residue is isopropyl.

The R'-residue is preferably selected from the group consisting of alkyl, alkenyl, aryl and aryalkyl residue with C1 to C20 carbon atoms. More preferably the R'-residue is a C3 to C20 branched or straight chain alkyl or alkenyl residue. Still more preferably the R'-residue is selected from the group consisting of —$(CH_2)_5$—$CH_3$, —$(CH_2)_6$—$CH_3$, —$(CH_2)_7$—$CH_3$, —$(CH_2)_8$—$CH_3$, —$(CH_2)_9$—$CH_3$, —$CH_2$—CH($CH_2CH_3$)—$(CH_2)_3$—$CH_3$ and —$(CH_2)_7$—CH=CH—$(CH_2)_7$—$CH_3$. Preferably the R' residue for the acyl group (OCOR') is —$(CH_2)_7$—CH=CH—$(CH_2)_7$—$CH_3$ or —$(CH_2)_7$—$CH_3$, the latter being especially preferred. On the other hand for the groups selected from —OP(OR')$_2$, —OPO(OR'), and —O—PO(OH)—O—PO(OR')$_2$ the R'-residue is preferably —$CH_2$—CH($CH_2CH_3$)—$(CH_2)_3$—$CH_3$. Further, in case the formula (I) comprises groups of O—S(O)$_2$—R' and/or —O—S—O—R' the R'-residue is an alkyl, an aryl or an aryalkyl residue with C1 to C20 carbons atoms. More preferably the R' residue for the O—S(O)$_2$—R' group and/or —O—S—O—R' group is a C1 to C20 branched or straight chain alkyl. Still more preferably the R' residue for the O—S(O)$_2$—R' group and/or —O—S—O—R' is selected from the group consisting of —$C_6H_4$—$(CH_2)_{11}$—$CH_3$, —$(CH_2)_5$—$CH_3$, —$(CH_2)_6$—$CH_3$, —$(CH_2)_7$—$CH_3$, —$(CH_2)_8$—$CH_3$, —$(CH_2)_9$—$CH_3$, —$CH_2$—CH($CH_2CH_3$)—$(CH_2)_3CH_3$, wherein —$C_6H_4$— in the present application is the abbreviation for para-substituted phenyl. Accordingly in an preferred embodiment the R'-residue for the O—S(O)$_2$—R' group and/or —O—S—O—R' is —$(CH_2)_7$—$CH_3$ or —$C_6H_4$—$(CH_2)_{11}$—$CH_3$, —$(CH_2)_5$—$CH_3$, the latter being preferred.

Accordingly preferred organic metallic compound (OM) of formula (I) are $(CH_3)_2$CH—O—Ti—[O—CO—$(CH_2)_7$—CH=CH—$(CH_2)_7$—$CH_3$]$_3$, $(CH_3)_2$CH—O—Ti—[O—S(O)$_2$—$C_6H_4$—$(CH_2)_{11}$—$CH_3$]$_3$, $(CH_3)_2$CH—O—Ti—[O—CO—CH($CH_2CH_3$)—$(CH_2)_{13}$—$CH_3$]$_3$, $(CH_3)_2$CH—O—

Ti—[O—P(O)(OH)—O—P(O)—(O—CH$_2$—CH(CH$_2$CH$_3$)—(CH$_2$)$_3$—CH$_3$)$_2$]$_3$, (CH$_3$)$_2$CH—O—Ti—[O—P(O)—(O—(CH$_2$)$_7$—CH$_3$)$_2$]$_3$, (CH$_3$)$_2$CH$_3$—O—Ti—[O—P—(O—CH$_2$—CH(CH$_2$CH$_3$)—(CH$_2$)$_3$—CH$_3$)$_2$]$_3$.

The organo metal compound (OM) of formula (II) is defined as

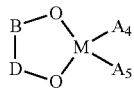

wherein

"M" is a metal of the groups 4 to 13 of the Periodic Table, preferably is a metal selected from the group consisting of titanium, zirconium, hafnium palladium, platinum, aluminum, more preferably is zirconium or titanium, yet more preferably is titanium, "A$_4$" and "A$_5$" are residues independently selected from the group consisting of

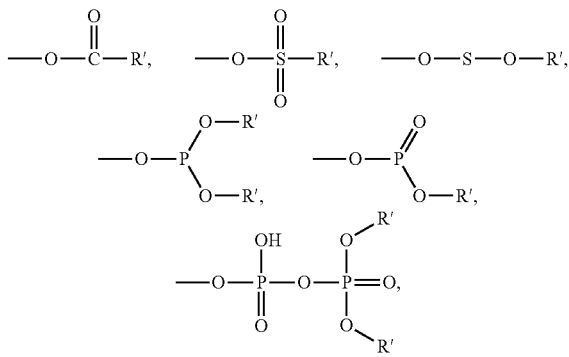

B is CR"$_2$ or carbonyl,
D is (CR''')$_n$
R' is an alkyl-, alkenyl-, alkinyl- or arylalkyl residue with 1 to 30 carbon atoms
R" is —H, —CH$_3$, or —CH$_2$CH$_3$,
R''' is selected from the group consisting of —H, —CH$_3$, —CH$_2$CH$_3$, —CH(CH$_3$)$_2$, —CH$_2$CH$_2$CH$_3$, —C(CH$_3$)$_3$, —CH(CH$_3$)CH$_2$CH$_3$, —CH$_2$CH(CH$_3$)CH$_3$, and —CH$_2$CH(CH$_3$)$_2$,
n is 1 or 2.

Preferably the residues "A$_4$" and "A$_5$" are identical.

The residue "B" is —CH$_2$— or —CO—, the latter being preferred. Further R''' of the residue "D" is preferably —H. Accordingly it is preferred that the ring of formula (II) is selected from the group consisting of either

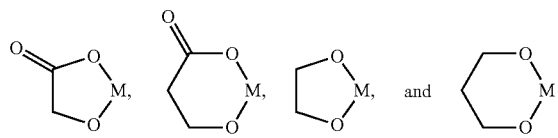

wherein M is preferably titanium.

The R'-residue is preferably selected from the group consisting of alkyl, alkenyl, aryl and aryalkyl residue with C1 to C20 carbon atoms. More preferably the R'-residue is a C3 to C20 branched or straight chain alkyl or alkenyl residue. Still more preferably the R'-residue is selected from the group consisting of —(CH$_2$)$_5$—CH$_3$, —(CH$_2$)$_6$—CH$_3$, —(CH$_2$)$_7$—CH$_3$, —(CH$_2$)$_8$—CH$_3$, —(CH$_2$)$_9$—CH$_3$, —CH$_2$—CH(CH$_2$CH$_3$)—(CH$_2$)$_3$—CH$_3$ and —(CH$_2$)$_7$—CH═CH—(CH$_2$)$_7$—CH$_3$. Preferably the R'-residue for the acyl group (OCOR') is —(CH$_2$)$_7$—CH═CH—(CH$_2$)$_7$—CH$_3$ or —(CH$_2$)$_7$—CH$_3$, the latter being especially preferred. On the other hand for the groups selected from —OP(OR')$_2$, —OPO(OR'), and —O—PO(OH)—O—PO(OR')$_2$ the R'-residue is preferably —CH$_2$—CH(CH$_2$CH$_3$)—(CH$_2$)$_3$—CH$_3$. Further, in case the formula (II) comprises groups of O—S(O)$_2$—R' and/or —O—S—O—R' the R' residue is an alkyl, an aryl or an aryalkyl residue with C$_1$ to C$_{20}$ carbon atoms. More preferably the R'-residue for the O—S(O)$_2$—R' group and/or —O—S—O—R' group is a C1 to C20 branched or straight chain alkyl. Still more preferably the R'-residue for the O—S(O)$_2$—R' and/or —O—S—O—R' group is selected from the group consisting of —C$_6$H$_4$—(CH$_2$)$_{11}$—CH$_3$, —(CH$_2$)$_5$—CH$_3$, —(CH$_2$)$_6$—CH$_3$, —(CH$_2$)$_7$—CH$_3$, —(CH$_2$)$_8$—CH$_3$, —(CH$_2$)$_9$—CH$_3$, —CH$_2$—CH(CH$_2$CH$_3$)—(CH$_2$)$_3$—CH$_3$. Accordingly in an preferred embodiment the R'-residue for the O—S(O)$_2$—R' group and/or —O—S—O—R' is —(CH$_2$)$_7$—CH$_3$ or —C$_6$H$_4$—(CH$_2$)$_{11}$—CH$_3$, —(CH$_2$)$_5$—CH$_3$, the latter being preferred.

Accordingly especially preferred organic metallic compound (OM) of formula (II) are selected from the group consisting of

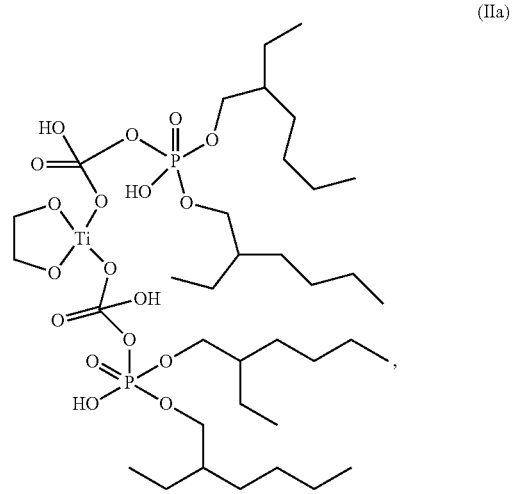

(IIa)

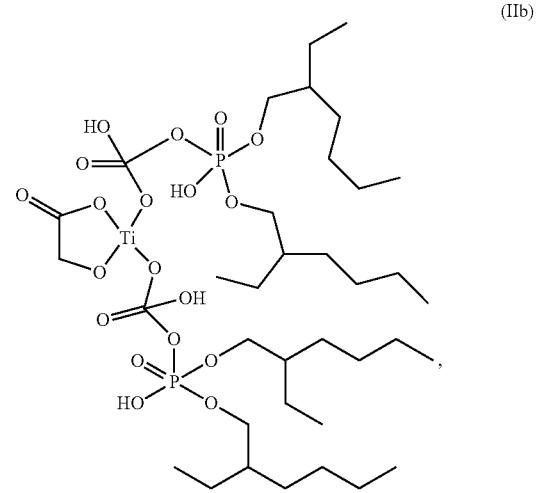

(IIb)

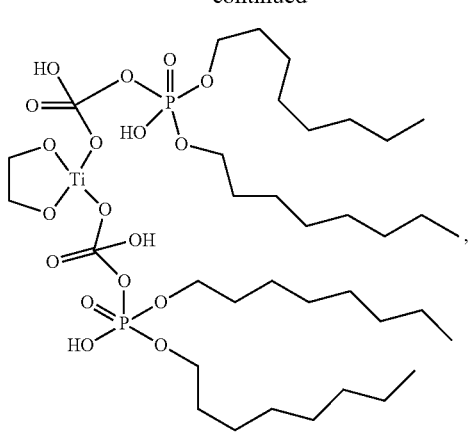
(IIc)

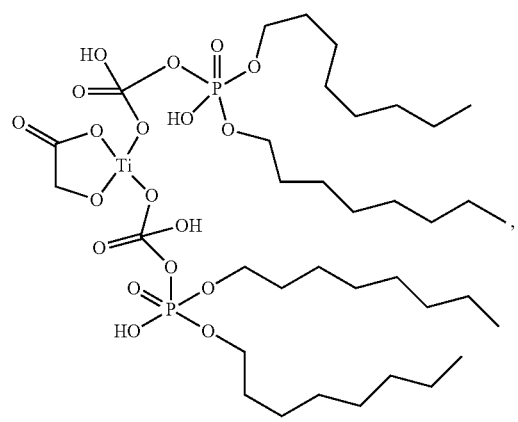
, and
(IId)

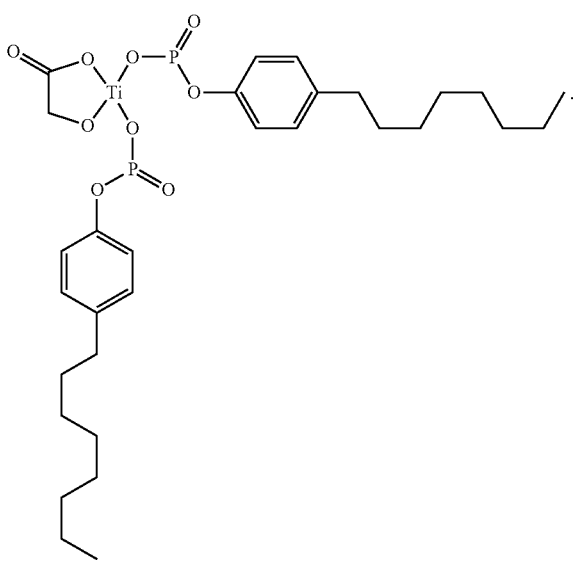
.
(IIe)

Preferred organic metallic compounds (OM) are the commercial products of Capaute Chemicals, like KH 101, KH 102, KH 105, KH 130, KH 109, KH 201, KH 311, and KH 401. Other preferred organic metallic compounds (OM) are those as disclosed on EP 1 829 917 A1. Accordingly the commercial products of Kenrich Petrochemicals, preferably those of the Ken-React® series, like the commercial products selected from the group consisting of KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA 01, LICA 09, LICA 12, LICA 38, LICA 44, LICA 97, LICA 99, KR OPPR, and KR OPP2 are preferred. Further preferred organic metallic compounds (OM) are the commercial products of Du Pont, preferably those of the Tyzor® series, like the commercial products selected from the group consisting of ET, TPT, NPT, BTM, AA, AA-75, AA-95, AA-105, TE, ETAM, and OGT.

Especially preferred organic metallic compounds (OM) are the commercial products are selected from the group consisting of KR 7, KR 9S, KR 12, KR 26S, KR 38S, KR44, LICA 09, LICA 44, NZ 44, ET, TPT, NPT, BTM, AA, AA-75, AA-95, AA-105, TE, and ETAM. The most preferred organic metallic compounds (OM) is KR 12.

The organic metallic compound (OM) as defined above is reacted with talc (T), thereby the organic metallic compound (OM) is covalently bonded on the surface of the talc (T) obtaining the coated talc (CT). The reaction of the organic metallic compound (OM) with talc (T) is state of the art and for instance described in U.S. Pat. No. 4,087,402 and DE 26 21 463 C2.

Preferably the weight ratio of talc (T):organo metal compound (OM) is from 1000:1 to 100:6, more preferably from 1000 to 3 to 100:4.

Further it is appreciated that the organo metal compound (OM) is present in an amount of at least 0.5 mg/m$^2$, more preferably of at least 0.8 mg/m$^2$, like in the range of 1.0 to 10.0 mg/m$^2$, in said coated talc (CT).

Preferably the coated talc (CT) according to this invention has a particle size (d50%) of below 3.0 μm (d50% indicates that 50 wt-% of the talc has a particle size below 3.0 μm), more preferably in the range of 0.5 to 1.5 μm and/or a particle size (d98%) of below 15.0 μm (d98% indicates that 98 wt-% of the talc has a particle size below 15.0 μm), more preferably in the range of 0.5 to 5.0 μm.

It is further appreciated that the polymer composition does not contain a considerable amount of unmodified talc, i.e. does not contain more than 5 wt.-%, more preferably not more than 3 wt.-%, yet more preferably not more than 1 wt.-%, still more preferably not more than 0.5 wt.-%, of unmodified talc. In a preferred embodiment the unmodified talc is not detectable within the polymer composition.

As indicated above, the increase of volatiles is in particular observed due to the presence of phenolic antioxidants as they can be degraded due to polymeric environment, i.e. due to other additives like talc. However antioxidants are needed to impair oxidative degradation of the polypropylene. Accordingly the polymer composition for which the organic metallic compound (OM) and/or the coated talc (CT) is used preferably contains phenolic antioxidants (AO).

The term "phenolic antioxidant" as used in the instant invention stands for any compound capable of slowing or preventing the oxidation of the polymer component, i.e. the polypropylene. Additionally such a phenolic antioxidant must of course comprise a phenolic residue.

Better results can be achieved in case the phenolic antioxidants (AO) are sterically hindered. The term "Sterically hindered" according to this invention means that the hydroxyl group (HO—) of the phenolic antioxidants (AO) is surrounded by sterical alkyl residues.

Accordingly the phenolic antioxidants (AO) preferably comprise the residue of formula (III)

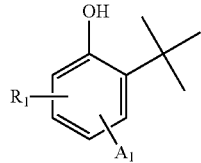

wherein
$R_1$ being located at the ortho- or meta-position to the hydroxyl-group and $R_1$ is $(CH_3)_3C—$, $CH_3—$ or H, preferably $(CH_3)_3C—$, and
$A_1$ constitutes the remaining part of the phenolic antioxidant (AO) and is preferably located at the para-position to the hydroxyl-group.

Preferably the phenolic antioxidants (AO) preferably comprise the residue of formula (IIIa)

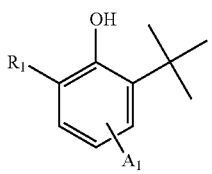

wherein
$R_1$ is $(CH_3)_3C—$, $CH_3—$ or H, preferably $(CH_3)_3C—$, and
$A_1$ constitutes the remaining part of the phenolic antioxidant (AO).
Preferably $A_1$ is in para-position to the hydroxyl-group.

Additionally the phenolic antioxidants (AO) shall preferably exceed a specific molecular weight. Accordingly the phenolic antioxidants (AO) have preferably a molecular weight of more than 785 g/mol, more preferably more than 1100 g/mol. On the other hand the molecular weight should be not too high, i.e. not higher than 1300 g/mol. A preferred range is from 785 to 1300 g/mol, more preferably from 1000 to 1300 g/mol, yet more preferably from 1100 to 1300 g/mol.

Further the phenolic antioxidants (AO) can be additionally defined by the amount of phenolic residues, in particular by the amount of phenolic residues of formula (III) or (Ina). Accordingly the phenolic antioxidants may comprise(s) 1, 2, 3, 4 or more phenolic residues (AO), preferably 1, 2, 3, 4 or more phenolic residues of formula (III) or (IIIa).

Moreover the phenolic antioxidants (AO) comprise mainly only carbon atoms, hydrogen atoms and minor amounts of O-atoms, mainly caused due to the hydroxyl group (HO—) of the phenolic residues. However the phenolic antioxidants (AO) may comprise additionally minor amounts of N, S and P atoms. Preferably the phenolic antioxidants (AO) are constituted by C, H, O, N and S atoms only, more preferably the phenolic antioxidants (AO) are constituted by C, H and O only.

As stated above the phenolic antioxidants (AO) shall have a rather high molecular weight. A high molecular weight is an indicator for several phenolic residues. Thus it is in particular appreciated that the phenolic antioxidants (AO) have 4 or more, especially 4, phenolic residues, like the phenolic residue of formula (III) or (IIIa).

As especially suitable phenolic antioxidants (AO) have been recognized compounds comprising at least one residue of formula (IV)

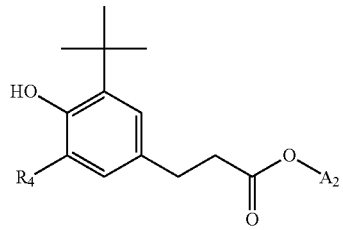

wherein
$R_4$ is $(CH_3)_3C—$, $CH_3—$, or H, preferably $(CH_3)_3C—$, and
$A_2$ constitutes the remaining part of the phenolic antioxidant (AO).

Considering the above requirements the phenolic antioxidants are preferably selected from the group consisting of
2,6-di-tert-butyl-4-methylphenol (CAS no. 128-37-0; M 220 g/mol), pentaerythrityl-tetrakis(3-(3,5-di-tert-butyl-4-hydroxyphenyl) propionate (CAS no. 6683-19-8; M 1178 g/mol),
octadecyl 3-(3',5'-di-tert-butyl-4-hydroxyphenyl)propionate (CAS no. 2082-79-3; M 531 g/mol)
1,3,5-trimethyl-2,4,6-tris-(3,5-di-tert-butyl-4-hydroxybenzyl)benzene (CAS no. 1709-70-2; M 775 g/mol),
2,2'-thiodiethylenebis(3,5-di-tert.-butyl-4-hydroxyphenyl) propionate (CAS no. 41484-35-9; M 643 g/mol),
calcium bis(ethyl 3,5-di-tert-butyl-4-hydroxybenzylphosphonate) (CAS no. 65140-91-2; M 695 g/mol),
1,3,5-tris(3',5'-di-tert. butyl-4'-hydroxybenzyl)-isocyanurate (CAS no. 27676-62-6, M 784 g/mol),
1,3,5-tris(4-tert. butyl-3-hydroxy-2,6-dimethylbenzyl)-1,3,5-triazine-2,4,6-(1H,3H,5H)-trione (CAS no. 40601-76-1, M 813 g/mol),
bis(3,3-bis(3'-tert-butyl-4'-hydroxyphenyl)butanic acid) glycolester (CAS no. 32509-66-3; M 794 g/mol),
4,4'-thiobis(2-tert-butyl-5-methylphenol) (CAS no. 96-69-5; M 358 g/mol),
2,2'-methylene-bis-(6-(1-methyl-cyclohexyl)-para-cresol) (CAS no. 77-62-3; M 637 g/mol),
3,3'-bis(3,5-di-tert-butyl-4-hydroxyphenyl)-N,N'-hexamethylenedipropionamide (CAS no. 23128-74-7; M 637 g/mol),
2,5,7,8-tetramethyl-2-(4',8',12'-trimethyltridecyl)-chroman-6-ol (CAS no. 10191-41-0; M 431 g/mol),
2,2-ethylidenebis(4,6-di-tert-butylphenol) (CAS no. 35958-30-6; M 439 g/mol),
1,1,3-tris(2-methyl-4-hydroxy-5'-tert-butylphenyl) butane (CAS no. 1843-03-4; M 545 g/mol),
3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; M 741 g/mol),
1,6-hexanediyl-bis(3,5-bis(1,1-dimethylethyl)-4-hydroxybenzene)propanoate) (CAS no. 35074-77-2; M 639 g/mol),
2,6-di-tert-butyl-4-nonylphenol (CAS no. 4306-88-1; M 280 g/mol),
4,4'-butylidenebis(6-tert-butyl-3-methylphenol (CAS no. 85-60-9; M 383 g/mol);
2,2'-methylene bis(6-tert-butyl-4-methylphenol) (CAS no. 119-47-1; M 341 g/mol), triethylenglycol-bis-(3-tert-butyl-4-hydroxy-5-methylphenyl) propionate (CAS no. 36443-68-2; M 587 g/mol), a mixture of C13 to C15 linear and branched alkyl esters of 3-(3',5'-di-t-butyl-4'-hydroxyphenyl) propionic acid (CAS no. 171090-93-0; $M_w$ 485 g/mol), 6,6'-di-tert-butyl-2,2'-thiodip-cresol (CAS no. 90-66-4; M 359 g/mol), diethyl-(3,5-di-tert-butyl-4-hydroxybenzyl) phosphate (CAS no. 976-56-7; M 356 g/mol), 4,6-bis(octylthiomethyl)-o-cresol (CAS no. 110553-27-0; M 425 g/mol), benzenepropanoic acid, 3,5-bis(1,1-dimethyl-ethyl)-4-hydroxy-, C7-C9-branched and linear alkyl esters (CAS no. 125643-61-0; $M_w$ 399 g/mol), 1,1,3-tris[2-methyl-4-[3-(3,5-di-tert-butyl-4-hydroxyphenyl)propionyloxy]-5-tert-butylphenyl]butane (CAS no. 180002-86-2; M 1326 g/mol), mixed styrenated phenols (M ca 320 g/mol; CAS no. 61788-44-1; M ca. 320 g/mol), butylated, octylated phenols (M ca 340 g/mol; CAS no. 68610-06-0; M ca 340 g/mol), and butylated reaction product of p-cresol and dicyclopentadiene ($M_w$ 700 to 800 g/mol; CAS no. 68610-51-5; $M_w$ 700-800 g/mol).

More preferably the phenolic antioxidants are selected from the group consisting of pentaerythrityl-tetrakis(3-(3,5-di-tert-butyl-4-hydroxyphenyl) propionate (CAS no. 6683-19-8; M 1178 g/mol), octadecyl 3-(3',5'-di-tert-butyl-4-hydroxyphenyl)propionate (CAS no. 2082-79-3; M 531 g/mol)

bis(3,3-bis(3'-tert-butyl-4'-hydroxyphenyl)butanic acid) glycolester (CAS no. 32509-66-3; M 794 g/mol), 3,3'-bis(3,5-di-tert-butyl-4-hydroxyphenyl)-N,N'-hexamethylenedipropionamide (CAS no. 23128-74-7; M 637 g/mol), 3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; M 741 g/mol), 1,6-hexanediyl-bis(3,5-bis(1,1-dimethylethyl)-4-hydroxybenzene)propanoate) (CAS no. 35074-77-2; M 639 g/mol), triethylenglycol-bis-(3-tert-butyl-4-hydroxy-5-methylphenyl) propionate (CAS no. 36443-68-2; M 587 g/mol), a mixture of C13 to C15 linear and branched alkyl esters of 3-(3',5'-di-t-butyl-4'-hydroxyphenyl) propionic acid (CAS no. 171090-93-0; $M_w$ 485 g/mol), and benzenepropanoic acid, 3,5-bis(1,1-dimethyl-ethyl)-4-hydroxy-, C7-C9-branched and linear alkyl esters (CAS no. 125643-61-0; $M_w$ 399 g/mol), The most preferred phenolic antioxidant is pentaerythrityl-tetrakis(3-(3,5-di-tert-butyl-4-hydroxyphenyl)propionate (CAS no. 6683-19-8; M 1178 g/mol) preferably having the formula (V)

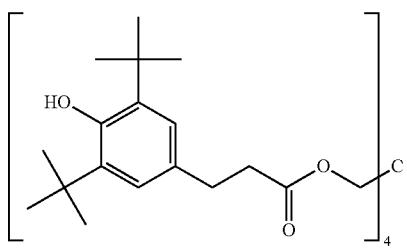

(V)

The present polymer composition may comprise different phenolic antioxidants (AO), as defined in the instant invention, however it is preferred that it comprises only one type of phenolic antioxidant (AO) as defined herein.

The polymer composition can additionally comprise one or more phosphorous antioxidants. More preferably the polymer composition comprises only one type of phosphorous antioxidant. Preferred phosphorous antioxidants are selected from the group consisting of tris-(2,4-di-tert-butylphenyl)phosphite (CAS no. 31570-04-4; M 647 g/mol), tetrakis-(2,4-di-tert-butylphenyl)-4,4'-biphenylen-di-phosphonite (CAS no. 38613-77-3; M 991 g/mol), bis-(2,4-di-tert-butylphenyl)-pentaerythrityl-di-phosphite (CAS no. 26741-53-7; M 604 g/mol), di-stearyl-pentaerythrityl-di-phosphite (CAS no. 3806-34-6; M 733 g/mol), tris-nonylphenyl phosphite (CAS no. 26523-78-4; M 689 g/mol), bis(2,6-di-tert-butyl-4-methylphenyl)pentaerythrityl-di-phosphite (CAS no. 80693-00-1; M 633 g/mol), 2,2'-methylenebis(4,6-di-tert-butylphenyl) octyl-phosphite (CAS no. 126050-54-2; M 583 g/mol), 1,1,3-tris(2-methyl-4-ditridecyl phosphite-5-tert-butylphenyl) butane (CAS no. 68958-97-4; M 1831 g/mol), 4,4'-butylidenebis(3-methyl-6-tert-butylphenyl-di-tridecyl) phosphite (CAS no. 13003-12-8; M 1240 g/mol), bis-(2,4-dicumylphenyl)pentaerythritol diposphite (CAS no. 154862-43-8; M 852 g/mol), bis(2-methyl-4,6-bis(1,1-dimethylethyl)phenyl) phosphorous acid ethylester (CAS no. 145650-60-8; M 514 g/mol), 2,2',2"-nitrilo triethyl-tris(3,3',5,5'-tetra-tert-butyl-1,1'-biphenyl-2,2'-diyl)phosphite) (CAS no. 80410-33-9; M 1465 g/mol)

2,4,6-tris(tert-butyl)phenyl-2-butyl-2-ethyl-1,3-propandiol-phosphit (CAS no. 161717-32-4, M 450 g/mol), 2,2'-ethyliden-bis(4,6-di-tert-butylphenyl)fluorphosphonit (CAS no. 118337-09-0; M 487 g/mol), 6-(3-(3-tert-butyl-4-hydroxy-5-methylphenyl)propoxy)-2,4,8,10-tetra-tert-butyldibenz[d,f][1.3.2]dioxaphosphepin (CAS no. 203255-81-6; M 660 g/mol), tetrakis-(2,4-di-tert-butyl-5-methylphenyl)-4,4'-biphenylen-di-phosphite (CAS no. 147192-62-9; M 1092 g/mol), and 1,3-bis-(diphenylphosphino)-2,2-dimethylpropane (CAS no. 80326-98-3; M 440.5 g/mol).

Especially suitable are organic phosphites, in particular those as defined in the above list, as phosphorous antioxidants.

The most preferred phosphorous antioxidant is tris-(2,4-di-tert-butylphenyl)phosphite (CAS no. 31570-04-4; M 647 g/mol).

As stated above known polymer compositions comprising talc and phenolic antioxidants suffer from a rather quick degradation of the antioxidants. Such quick degradation is caused by the presence of talc and more importantly by the residues within in the talc. These residues may catalyse the degradation of the organic antioxidants. Thus especially in case the polymer composition for which the coated talc (CT) is used contains small amounts of unmodified talc (but also in cases in which the polymer compositions contains no talc), said polymer composition can contain further additives which may impede the catalytic activity of coated talc (CT) and/or of the unmodified talc (T) in view of the phenolic antioxidants and thus reduces the degradation process and associated therewith minimises the headspace emission.

It has been in particular discovered that polyethers are in particular useful. Polyethers are generally speaking polymers with more than one ether group. Accordingly polyethers are preferably polyethers with a weight average molecular weight ($M_w$) of at least 300 g/mol, more preferably of at least 700 g/mol. More preferably such polyethers have a weight average molecular weight ($M_w$) of not more than 13,000 g/mol. In one preferred embodiment the polyethers according to this invention have weight average molecular weight ($M_w$) of 300 to 12,000 g/mol, more preferably of 700 to 8,000 g/mol and yet more preferably of 1,150 to 8,000 g/mol.

Without be bonded on the theory the polyethers as used in herein are able to bond on the surface of coated talc (CT) (in addition to the organo-metallic compound (OM)) and/or of the unmodified talc (T) and thus form a kind of sheeting surrounding the unmodified talc (T) particles. The bonding may be a covalent bonding and/or ionic bonding. Accordingly the polyethers impede contacting of the phenolic antioxidants (AO) with the coated talc (CT) and/or of the unmodified talc (T). Thus any degradation caused by coated talc (CT) and/or of the unmodified talc (T) is therewith minimized or avoided.

As especially useful polyethylene glycols and/or epoxy resins have been recognized In case polyethylene glycols are present in the polymer composition the following are preferred: polyethylene glycol having a weight average molecular weight ($M_w$) of about 4,000 g/mol (CAS-no 25322-68-3), polyethylene glycol having a weight average molecular weight ($M_w$) of about 8,000 g/mol (CAS-no 25322-68-3), polyethylene glycol having a weight average molecular weight ($M_w$) of about 10,000 g/mol (CAS-no 25322-68-3) and/or polyethylene glycol having a weight average molecular weight ($M_w$) of about 20,000 g/mol (CAS-no 25322-68-3). Especially preferred polyethylene glycols are PEG 4000 and/or PEG 10000 of Clariant.

Epoxy resins are in particular appreciated as they comprise reactive epoxy groups simplifying a covalent bonding of the epoxy resin with the coated talc (CT) and/or with the unmodified talc (T). Accordingly the epoxy resins are tightly bonded on the surface of coated talc (CT) and/or of the unmodified talc (T) and therefore provide an especially suitable protection against degradation of the phenolic antioxidants (AO). Even more preferred the epoxy resins comprise phenyl groups. Such phenyl groups have the additional advantage that they act as scavengers for possible degradation products of the phenolic antioxidants (AO). Without be bonded on the theory it is very likely that the phenyl groups of the epoxy resins will be Friedel-Crafts alkylated. Typically the alkylating groups originate from the phenolic antioxidants (AO). One example is 2-methyl-1-propene, a typical degradation product of hindered phenolic antioxidants (AO) as defined above. Accordingly it is preferred that the polymer composition for which the organo-metallic compound (OM) and/or the coated talc (CT) is/are used comprises epoxy resins comprising units derived from a monomer of the formula (VI)

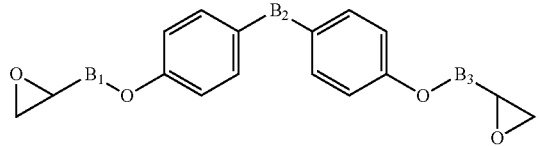

(VI)

wherein
$B_1$ and $B_3$ are independently selected from the group consisting of —(CH$_2$)—, —(CH$_2$)$_2$—, —(CH$_2$)$_3$—, —(CH$_2$)$_4$—, and —(CH$_2$)$_5$—, preferably $B_1$ and $B_3$ are —(CH$_2$)—, and $B_2$ is selected from the group consisting of —((CH$_3$)$_2$C)—, —((CH$_3$)$_2$C)$_2$—, —((CH$_3$)$_2$C)$_3$—, —CH$_2$—((CH$_3$)$_2$C)—, —((CH$_3$)$_2$C)—CH$_2$—, —CH$_2$—((CH$_3$)$_2$C)—CH$_2$— and —CH$_2$—((CH$_3$)$_2$C)$_2$—CH$_2$—, preferably $B_2$ is —((CH$_3$)$_2$C)—. Thus it is appreciated that the epoxy resins comprises units derived from a monomer of the formula (VI-a)

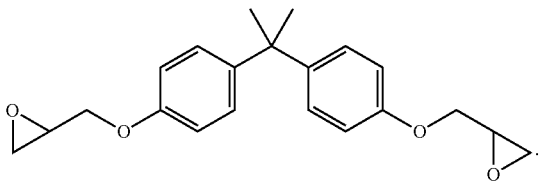

(VI-a)

Further it is preferred that the epoxy resins comprises not only units derived from a monomer of the formula (VI) or (VI-a) but additionally units derived from a monomer of the formula (VII)

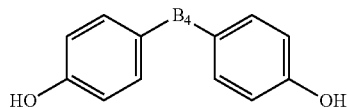

(VII)

wherein
$B_4$ is selected from the group consisting of —((CH$_3$)$_2$C)—, —((CH$_3$)$_2$C)$_2$—, —((CH$_3$)$_2$C)$_3$—, —CH$_2$—((CH$_3$)$_2$C)—, —((CH$_3$)$_2$C)—CH$_2$—, —CH$_2$—((CH$_3$)$_2$C)—CH$_2$— and —CH$_2$—((CH$_3$)$_2$C)$_2$—CH$_2$—. Especially preferred are monomers of formula (VII), wherein $B_4$ is —((CH$_3$)$_2$C)—.

Accordingly the epoxy resins have preferably the formula (VIII)

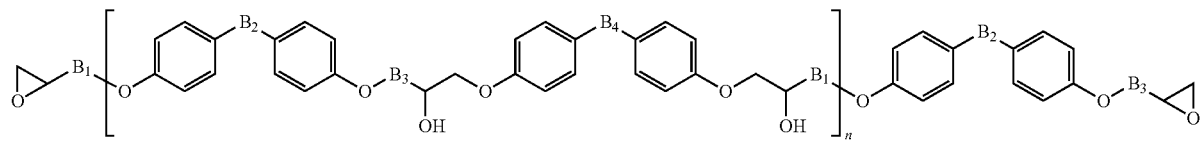

(VIII)

wherein

B₁ and B₃ are independently selected from the group consisting of —(CH₂)—, —(CH₂)₂—, —(CH₂)₃—, —(CH₂)₄—, and —(CH₂)₅—, B₂ and B₄ are independently selected from the group consisting of —((CH₃)₂C)—, —((CH₃)₂C)₂—, —((CH₃)₂C)₃—, —CH₂—((CH₃)₂C)—, —((CH₃)₂C)—CH₂—, —CH₂—((CH₃)₂C)—CH₂— and —CH₂—((CH₃)₂C)₂—CH₂—, and n is from 1 to 20.

Additionally it is preferred that the epoxy resins have an epoxy index in the range of 1.10 to 2.00 Eq/kg, more preferably 1.12 to 1.60 Eq/kg, wherein the epoxy index corresponds to the number of epoxy functions in respect of 100 g of resin.

The most preferred epoxy resin is poly(2,2-bis[4-(2,3-epoxypropoxy]-phenyl]propane-co-(2-chloromethyl oxirane) (CAS-no 25036-25-3), in particular with an epoxy index as defined in the previous paragraph.

Additionally or alternatively to the polyethers as defined above the polymer composition for which the organo-metallic compound (OM) and/or the coated talc (CT) is/are used may contain carbonyl compounds, like carboxylic acids, carboxylic acid amides and/or carboxylic acid esters. Such carbonyl compounds achieve the same effect as discussed above for the polyethers.

As especially useful aromatic carboxylic acids, fatty acid amides and fatty acid esters have been recognized.

In case the polymer composition comprises carboxylic acids the benzoic acid is most preferred.

In case the polymer composition comprises carboxylic acid amides it is preferred that the carboxylic acid amides have C10 to C25 carbon atoms, more preferably C16 to C24 carbon atoms. Even more preferred the carboxylic acid amides are fatty acid amides having C10 to C25 atoms, like C16 to C24 carbon atoms. Particularly the carboxylic acid amides are unsaturated. Thus unsaturated fatty acid amides, like unsaturated fatty acid amides having C10 to C25 atoms, like C16 to C24 carbon atoms, are especially appreciated. Accordingly the carboxylic acid amides are preferably selected from the group consisting of 13-docosenamide (CAS no. 112-84-5), 9-octadecenamide (CAS no. 301-02-0), stearamide (CAS no. 124-26-5) and behenamide (CAS no. 3061-75-4). The most preferred carboxylic acid amide is 13-docosenamide (CAS no. 112-84-5).

In case the polymer composition comprises carboxylic acid ester, like fatty acid ester, it is appreciated that the carboxylic acid esters are glycerol esters of the formula (IX)

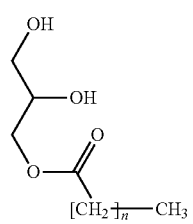

(IX)

wherein n is 5 to 25, preferably 10 to 18.

Alternatively the carboxylic acid esters can be glycerol esters of the formula (IX-a) or (IX-b)

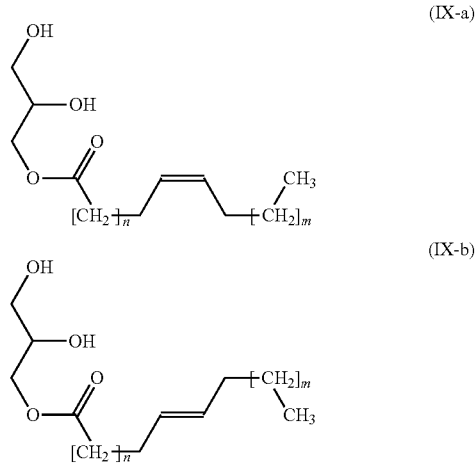

wherein n and m are independently 1 to 9, preferably 4 to 8. More preferably n and m are identically.

Accordingly the carboxylic acid esters are preferably selected from the group consisting of glycerol monostearate, glycerol monolaurate and 1,3-dihydroxypropan-2-yl(Z)-octadec-9-enoate.

Considering the above given information the present invention is directed to the use of an coated talc (CT) in a polymer composition to accomplish a headspace emission measured according to VDA 277

(a) of all volatiles together of said polymer composition of equal or below 120 µg/g, preferably below 110 µg/g, more preferably below 100 µg/g. still more preferably below 95 µg/g and/or (b) of 2-methyl-propene of said polymer composition of not more than 70 µg/g, preferably below 20 µg/g, more preferably below 10 µg/g. still more preferably below 5 µg/g, yet more preferably below 1.0 µg/g, still yet below 0.7 µg/g, like below the detection limit of 2-methyl-propene, wherein further the polymer composition comprises (a) at least 50 wt.-%, preferably at least 70 wt.-%, more preferably at least 75 wt.-%, polypropylene, like heterophasic propylene copolymer (b) 1,000 to 550,000 ppm, preferably 50,000 to 500,000 ppm, more preferably 100,000 to 400,000 ppm, yet more preferably 150,000 to 300,000 ppm, coated talc (CT), preferably a coated talc obtained by treating talc with an organo-metallic compound (OM) selected from the group consisting of (CH₃)₂CH—O—Ti—[O—CO—(CH₂)₇—CH=CH—(CH₂)₇—CH₃]₃, (CH₃)₂CH—O—Ti—[O—S(O)₂—C₆H₄—(CH₂)₁₁—CH₃]₃, (CH₃)₂CH—O—Ti—[O—CO—CH(CH₂CH₃)—(CH₂)₁₃—CH₃]₃, (CH₃)₂CH—O—Ti—[O—P(O)(OH)—O—P(O)—(O—CH₂—CH(CH₂CH₃)—(CH₂)₃—CH₃)₂]₃, (CH₃)₂CH—O—Ti—[O—P(O)—(O—(CH₂)₇—CH₃)₂]₃, and (CH₃)₂CH—O—Ti—[O—P—(O—CH₂—CH(CH₂CH₃)—(CH₂)₃—CH₃)₂]₃, (c) 100 to 5,000 ppm, preferably 500 to 5,000 ppm, more preferably 500 to 3,000 ppm, yet more preferably 200 to 1,000 ppm, of phenolic antioxidants (AO), like pentaerythrityl-tetrakis(3-(3,5-di-tert-butyl-4-hydroxyphenyl) propionate (CAS no. 6683-19-8; M 1178 g/mol), (d) optionally 100 to 5,000 ppm, preferably 500 to 3,000 ppm, more preferably 500 to 1,500 ppm, yet more preferably 1,000 to 1,500 ppm, of phosphorous antioxidants, like tris-(2,4-di-tert-butylphenyl)phosphite (CAS no. 31570-04-4; M 647 g/mol), (e) optionally 100 to 20,000 ppm, preferably 100 to 10,000 ppm, more preferably 500 to 5,000 ppm, yet more preferably 500 to 3,000 ppm, still more preferably 800 to 3,000 ppm, polyethers, preferably polyethylene glycols and/or epoxy resins, like poly(2,2-bis[4-(2,3-epoxypropoxy]-phenyl]propane-co-(2-chloromethyl oxirane) (CAS-no 25036-25-3), and (f) optionally 100 to 8,000 ppm, preferably 500 to 5,000 ppm, more preferably 500 to 3,000 ppm, yet more preferably 800 to 3,000 ppm, of carbonyl compounds selected from the group consisting of carboxylic acid, like aromatic carboxylic acid (benzoic acid), carboxylic acid amide, like fatty acid amide, and carboxylic acid ester, like fatty acid ester (e.g. glycerol ester according to formulas (VIII), (IX-a) and (IX-b)), as defined in the instant invention based on the polymer composition. As stated above it is preferred that the polymer composition comprises as polymer said polypropylene only.

Of course the polymer composition may comprise further additives like calcium stearate and/or pigments, for instance in the form of a master batch.

However it is especially appreciated as stated above that the polymer composition is free of hindered amine light stabilizers and/or slip agents, preferably slip agents being fatty acid amides.

According to the present invention hindered amine light stabilizers are in particular 2,6-alkyl-piperidine derivatives, like 2,2,6,6-tetramethyl-piperidine derivatives. Thus it is appreciated that the present polymer composition is free of such piperidine derivatives.

Additionally the polymer composition shall be free of slip agents being a fatty acid amide. More preferably the polymer composition shall be free of slip agents being unsaturated fatty acid amides. The amount of carbons of the fatty acids is preferably in the range of C10 to C25 carbon atoms.

The polymer composition with the reduced amount of volatiles is preferably obtained by extruding the polymer and thereby adding the additives as mentioned in the instant invention. Preferably a twin-screw extruder is used, like the twin-screw extruder ZSK40. The polymer composition pelletized with the twin-screw extruder ZSK 40 is used in the headspace emission test according to VDA 277.

The present invention is additionally directed to polymer composition comprising (a) at least 50 wt.-%, preferably at least 70 wt.-%, more preferably at least 75 wt.-%, polypropylene, like heterophasic propylene copolymer (b) 1,000 to 550,000 ppm, preferably 50,000 to 500,000 ppm, more preferably 100,000 to 400,000 ppm, yet more preferably 150,000 to 300,000 ppm, coated talc (CT), preferably a coated talc obtained by treating talc with an organo-metallic compound (OM) of formula (I) or formula (II), more preferably a coated talc obtained by treating talc with an organo-metallic compound (OM) selected from the group consisting of $(CH_3)_2CH-O-Ti-[O-CO-(CH_2)_7-CH=CH-(CH_2)_7-CH_3]_3$, $(CH_3)_2CH-O-Ti-[O-S(O)_2-C_6H_4-(CH_2)_{11}-CH_3]_3$, $(CH_3)_2CH-O-Ti-[O-CO-CH(CH_2CH_3)-(CH_2)_{13}-CH_3]_3$, $(CH_3)_2CH-O-Ti-[O-P(O)(OH)-O-P(O)-(O-CH_2-CH(CH_2CH_3)-(CH_2)_3-CH_3)_2]_3$, $(CH_3)_2CH-O-Ti-[O-P(O)-(O-(CH_2)_7-CH_3)_2]_3$, and $(CH_3)_2CH-O-Ti-[O-P-(O-CH_2-CH(CH_2CH_3)-(CH_2)_3-CH_3)_2]_3$, (c) 100 to 5,000 ppm, preferably 500 to 5,000 ppm, more preferably 500 to 3,000 ppm, yet more preferably 200 to 1,000 ppm, of phenolic antioxidants, like pentaerythrityl-tetrakis (3-(3,5-di-tert-butyl-4-hydroxyphenyl) propionate (CAS no. 6683-19-8; M 1178 g/mol), (d) optionally 100 to 5,000 ppm, preferably 500 to 3,000 ppm, more preferably 500 to 1,500 ppm, yet more preferably 1,000 to 1,500 ppm, of phosphorous antioxidants, like tris-(2,4-di-tert-butylphenyl)phosphite (CAS no. 31570-04-4; M 647 g/mol), based on the polymer composition, wherein the headspace emission measured according to VDA 277

(a) of all volatiles together of said polymer composition of equal or below 120 µg/g, preferably below 110 µg/g, more preferably below 100 µg/g. still more preferably below 95 µg/g and/or (b) of 2-methyl-propene of said polymer composition of not more than 70 µg/g, preferably below 20 µg/g, more preferably below 10 µg/g. still more preferably below 5 µg/g, yet more preferably below 1.0 µg/g, still yet below 0.7 µg/g, like below the detection limit of 2-methyl-propene.

Preferably the polymer composition comprises said polypropylene as the only polymer. Concerning the individual components of the polymer composition it is referred to the comments made above.

Further the polymer composition is used as a covering element for vehicles and/or back sheets of blister packaging, in particular to accomplish headspace emission according to VDA 277, in particular to accomplish the headspace emission of 2-methyl-propene according to VDA 277, as defined in the instance invention.

Furthermore the present invention is directed to articles, preferably automotive articles, more preferably automotive interior articles, like dashboards, door claddings, armrests or other interior trims, comprising the polymer composition as defined herein. The invention is further directed to blister packaging, in particular to the back sheets of blister packaging, comprising the polymer composition of the instant invention.

The present invention is further described by way of examples.

EXAMPLES

The following definitions of terms and determination of methods apply for the above general description of the invention as well as to the below examples unless otherwise defined.

Molecular Weights, Molecular Weight Distribution (Mn, Mw, MWD)

Mw/Mn/MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

MFR$_2$ (230° C.) is measured according to ISO 1133 (230° C., 2.16 kg load).

Ethylene content is measured with Fourier transform infrared spectroscopy (FTIR) calibrated with $^{13}$C-NMR. When measuring the ethylene content in polypropylene, a thin film of the sample (thickness about 250 μm was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Particle size is measured according to ISO 13320-1:1999

The xylene solubles (XS, wt.-%): Content of Xylene solubles (XS) is determined at 23° C. according ISO 6427.

Heat Distortion Temperature (HDT) was determined according to ISO 75 A using injection molded test specimens of 80×10×4 mm$^3$ as described in EN ISO 1873-2 (80×10×4 mm) [HDT-A (1.8 MPa)]

Flexural Modulus: The flexural modulus was determined in 3-point-bending according to ISO 178 on injection molded specimens of 80×10×4 mm prepared in accordance with ISO 294-1:1996.

VDA 277 (available for instance from "Dokumentation Kraftfahrwesen (DKF); Ulrichstraße 14, 74321 Bietigheim Bissingen)

The content of volatiles is determined according to VDA 277:1995 using a gas chromatography (GC) device with a WCOT-capillary column (wax type) of 0.25 mm inner diameter and 30 m length. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

In addition to the FID detector for the summary volatile evaluation a MS detector is used for the evaluation of the single volatile components. A specific Quadropol MS was used with the following settings: 280° C. transfer-line temperature, scan method with scanning rate of 15-600 amu, relative EMV mode, mass calibration with standard spectra autotune, MS source temperature of 230° C. and MS Quad temperature of 150° C.

Preparation of Examples

TABLE 1

Properties of the examples

| | | CE 1 | CE 2 | E 1 |
|---|---|---|---|---|
| H-PP | [wt.-%] | 100 | 79.772 | 79.178 |
| AO 1 | [wt.-%] | — | 0.228 | 0.228 |
| AO 2 | [wt.-%] | 0.072 | 0.072 | 0.072 |
| Coated Talc | [wt.-%] | — | — | 20.000 |
| Talc | [wt.-%] | — | 20.000 | — |
| total content volatile [VDA 277] | [μgC/g] | 40 | 143 | 91 |
| 2-methyl-1-propene [VDA 277] | [μgC/g] | 0.2 | 72.5 | 0.0 |

TABLE 1-continued

Properties of the examples

| | | CE 1 | CE 2 | E 1 |
|---|---|---|---|---|
| HDT | [1.8 MPa/° C.] | 55 | 74 | 72 |
| Flexural Modulus | [MPa] | 1520 | 3480 | 3300 |

H-PP: propylene homopolymer, namely the commercial product HD120MO of Borealis (MFR$_2$ of 8 g/10 min; xylene soluble content of 1.5 wt.-%)
AO 1: phenolic antioxidant, namely pentaerythrityl-tetrakis(3-(3',5'-di-tert. butyl-4-hydroxyphenyl)-propionate (CAS no 6683-19-8) [IRGANOX 1010]
AO 2: phenolic antioxidant, namely a blend of pentaerythrityl-tetrakis(3-(3',5'-di-tert. butyl-4-hydroxyphenyl)-propionate (CAS no 6683-19-8) [IRGANOX 1010 of Ciba] and tris (2,4-di-t-butylphenyl) phosphite (CAS no 31570-04-4) [Irgafos 168 of Ciba] in the weight ratio of 1:2
Coated Talc Jetfine 3CA spray-coated with 3 wt.-% KR12 isopropyl tri(dioctylphosphate) titanate (CAS No. 65345-34-8)
Talc the commercial talc Jetfine 3CA of Luzenac Europe, F

We claim:
1. Process for the reduction of headspace emission in a polymer composition, comprising: (a) at least 50 wt.-% polypropylene, (b) 100 to 5,000 ppm of phenolic antioxidants (AO), (c) optionally 100 to 5,000 ppm of phosphorous antioxidants based on the polymer composition, the process comprising the steps:
(i) providing a talc (T);
(ii) treating the talc (T) to obtain a coated talc (CT); and
(iii) reducing the amount of headspace emission by adding 10,000 to 550,000 ppm of the coated talc (CT) to the polymer composition to provide a headspace emission measured according to VDA 227
(a) of all volatiles together of said polymer composition of equal or below 120 μg/g, and/or
(b) of 2-methyl-propene of said polymer composition of not more than 70 μg/g,
wherein said talc (CT) is coated with an organo-metallic compound (OM), said organo metal compound (OM) is defined by formula (I) or formula (II), said formula (I) is

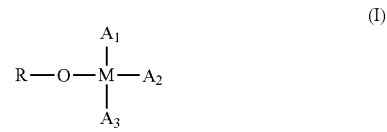

wherein
"M" is a metal of the groups 4 to 13 of the Periodic Table, "A$_1$", "A$_2$", and "A$_3$" are residues independently selected from the group consisting of

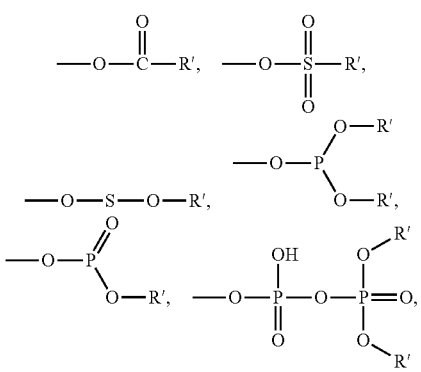

R is an alkyl-, alkenyl-, alkinyl- or arylalkyl residue with 1 to 30 carbon atoms, R' is an alkyl-, alkenyl-, alkinyl- or arylalkyl residue with 1 to 30 carbon atoms, and said formula (II) is

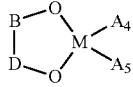
(II)

wherein
"M" is a metal of the groups 4 to 13 of the Periodic Table,
"$A_4$" and "$A_5$" are residues independently selected from the group consisting of

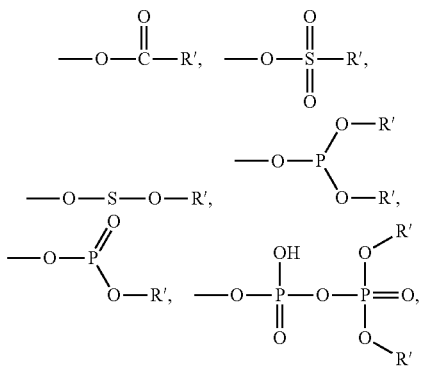

B is CR"$_2$ or carbonyl,
D is (CR''')$_n$,
R' is an alkyl-, alkenyl-, alkinyl- or arylalkyl residue with 1 to 30 carbon atoms,
R" is —H, —CH$_3$, or —CH$_2$CH$_3$,
R''' is selected from the group conisting of —H, —CH$_3$, —CH$_2$CH$_3$, —CH(CH$_3$)$_2$, —CH$_2$CH$_2$CH$_3$, —C(CH$_3$)$_3$, —CH(CH$_3$)CH$_2$CH$_3$, —CH$_2$CH(CH$_3$)CH$_3$, and —CH$_2$CH(CH$_3$)$_2$,
n is 1 or 2,
wherein said polymer composition having coated talc has a lower headspace emission than the same composition but with unmodified talc.

2. Process according to claim 1, wherein said coated talc (CT) is covalently bonded with the organo-metallic compound (OM).

3. Process according to claim 1, wherein the metal of the organo-metallic compound (OM) is zirconium or titanium compound.

4. Process according to claim 1, wherein the weight ratio of talc (T): organo metal compound (OM) is from 1000:1 to 100:6.

5. Process according to claim 1, wherein the organo metal compound (OM) is present in an amount of at least 0.5 mg/m$^2$ in said coated talc (CT).

6. Process according to claim 1, wherein the polymer composition does not comprise unmodified talc (T).

7. Process according to claim 1, wherein the polypropylene is a heterophasic propylene copolymer comprising a polypropylene matrix and an amorphous elastomer.

8. Process according to claim 1, wherein the phenolic antioxidant(s) (AO) is/are (a) sterically hindered phenolic antioxidant(s).

9. Process according to claim 1, wherein the phenolic antioxidant(s) (AO) comprise(s) at least one residue of formula (III)

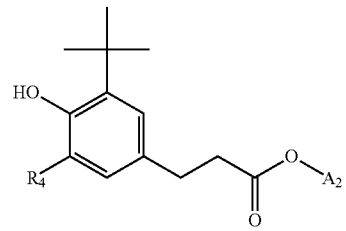

wherein
$R_4$ is (CH$_3$)$_3$C—, CH$_3$—, or H, preferably (CH$_3$)$_3$C—, and $A_2$ constitutes the remaining part of the phenolic antioxidant(s) (AO).

10. Process according to claim 1, wherein the polymer composition comprises additionally
(a) polyethers having a weight average molecular weight ($M_w$) of more than 300 g/mol, and/or
(b) carbonyl compounds selected from the group consisting of carboxylic acid, carboxylic acid amide and carboxylic acid ester.

11. Process according to claim 1, wherein the "M" of formulas (I) and (II) is zirconium or titanium and wherein the "R" of formula (I) is a branched or unbranched C1 to C20 alkyl residue.

12. Polymer composition comprising,
(a) at least 50 wt.-% polypropylene
(b) 10,000 to 550,000 ppm coated talc (CT),
(c) 100 to 5,000 ppm of phenolic antioxidants (AO), and
(d) optionally 100 to 5,000 ppm of phosphorous antioxidants based on the polymer composition
wherein the headspace emission measured according to VDA 277
(i) of all volatiles together of said polymer composition is of equal or below 120 μg/g and/or
(ii) of 2-methyl-propene of said polymer composition is of not more than 70 μg/g,
wherein said polymer composition haying coated talc has a lower headspace emission than the same composition but with unmodified talc,
wherein said talc (CT) is coated with an organo-metallic compound (OM), said organo metal compound (OM) is defined by formula (I) or formula (II), said formula (I) is

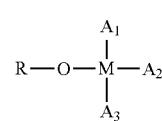
(I)

wherein
"M" is a metal of the groups 4 to 13 of the Periodic Table,
"$A_1$", "$A_2$", and "$A_3$" are residues independently selected from the group consisting of

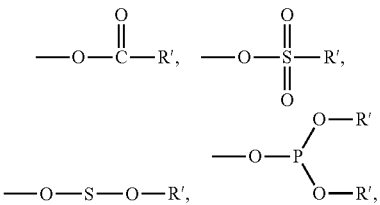

-continued

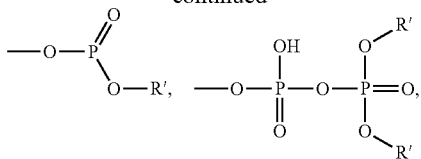

R is an alkyl-, alkenyl-, alkinyl- or arylalkyl residue with 1 to 30 carbon atoms,
R' is an alkyl-, alkenyl-, alkinyl- or arylalkyl residue with 1 to 30 carbon atoms,
and said formula (II) is

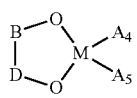
(II)

wherein
"M" is a metal of the groups 4 to 13 of the Periodic Table,
"$A_4$" and "$A_5$" are residues independently selected from the group consisting of

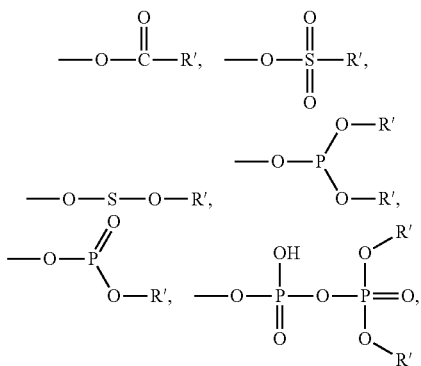

B is $CR''_2$ or carbonyl,
D is $(CR''')_n$,
R' is an alkyl-, alkenyl-, alkinyl- or arylalkyl residue with 1 to 30 carbon atoms,
R" is —H, —$CH_3$, or —$CH_2CH_3$,
R''' is selected from the group conisting of —H, —$CH_3$, —$CH_2CH_3$, —$CH(CH_3)_2$, —$CH_2CH_2CH_3$, —$C(CH_3)_3$, —$CH(CH_3)CH_2CH_3$, —$CH_2CH(CH_3)CH_3$, and —$CH_2CH(CH_3)_2$)
n is 1 or 2.

13. Polymer composition according to claim 12, wherein the polypropylene is a heterophasic propylene copolymer comprising a polypropylene matrix and an amorphous elastomer.

14. Polymer composition of claim 12, wherein the "M" of formulas (I) and (II) is zirconium or titanium and wherein the "R" of formula (I) is a branched or unbranched C1 to C20 alkyl residue.

15. Polymer composition of claim 12, wherein the phenolic antioxidant(s) (AO) is/are (a) sterically hindered phenolic antioxidants(s).

16. The polymer composition of claim 12, wherein the phenolic antioxidant(s) (AO) comprise(s) at least one residue of formula (III)

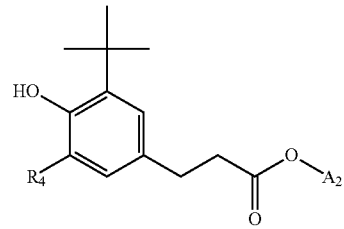

wherein
$R_4$ is $(CH_3)_3C$—, $CH_3$—, or H, preferably $(CH_3)_3C$—, and $A_2$ constitutes the remaining part of the phenolic antioxidant(s) (AO).

17. Polymer composition of claim 12, wherein the weight ratio of talc (T): organo metal compound (OM) is from 1000:1 to 100:6.

18. Polymer composition of claim 12, wherein the organo metal compound (OM) is present in an amount of at least 0.5 mg/m³ in the coated talc (CT).

* * * * *